United States Patent

Bauer

[15] 3,646,596
[45] Feb. 29, 1972

[54] FLUID SYSTEM FOR A VEHICLE WITH FLUID DRIVE MEANS

[72] Inventor: James J. Bauer, Lisbon, N. Dak.
[73] Assignee: Clark Equipment Company
[22] Filed: Jan. 26, 1970
[21] Appl. No.: 5,756

[52] U.S. Cl.........................60/52 HE, 60/53 R, 60/DIG. 5, 60/97 P
[51] Int. Cl.........................................................F15b 15/18
[58] Field of Search...............60/52 HE, 53 R, 52 VS, DIG. 5

[56] References Cited

UNITED STATES PATENTS

| | | | |
|---|---|---|---|
| 3,148,502 | 9/1964 | Granryd | 60/53 R X |
| 3,401,605 | 9/1968 | Born | 60/DIG. 5 |

Primary Examiner—Edgar W. Geoghegan
Attorney—Kenneth C. Witt, John C. Wiessler, Robert H. Johnson and Reginald J. Falkowski

[57] ABSTRACT

A fluid system for supplying pressurized fluid to the accessory motor means and hydrostatic drive means of a vehicle. The system includes first pump means and first valve means for controlling the supply of fluid from the first pump means to the accessory motor means. Also, second pump means is connected to the first valve means and hydrostatic drive means for supplying fluid to the hydrostatic drive means. Second valve means is connected to the first valve means, second pump means and a reservoir for bypassing fluid from the first valve means to the reservoir or drawing fluid from the reservoir to the second pump means.

11 Claims, 2 Drawing Figures

INVENTOR
JAMES J. BAUER
BY Robert H. Johnson
ATTORNEY

FLUID SYSTEM FOR A VEHICLE WITH FLUID DRIVE MEANS

BACKGROUND OF THE INVENTION

The field of art to which this invention relates includes fluid systems with multiple pumps.

A principal object of my invention is to provide a fluid system which is simple, has improved fluid cooling means and utilizes a single reservoir.

SUMMARY OF THE INVENTION Invention

In carrying out my invention in a preferred embodiment, I provide, for use with accessory motor means and hydrostatic drive means, a fluid system including first pump means which supplies pressurized fluid to first valve means which controls the supply of pressurized fluid to the accessory motor means. Second pump means is connected to the first valve means and the hydrostatic drive means for supplying pressurized fluid to the hydrostatic drive means from the first valve means, and second valve means is connected to the first valve means, second pump means and a reservoir for bypassing fluid to the reservoir from the first pump means or drawing fluid from the reservoir by the second pump means. A conduit is connected to the hydrostatic drive means, a cooler, the reservoir and the first pump means for returning leakage fluid from the hydrostatic drive means to the reservoir and first pump means through the cooler.

The above and other objects, features and advantages of my invention will be more readily understood by persons skilled in the art when the following drawings are taken in conjunction with the description.

DESCRIPTION OF THE PREFERRED EMBODIMENT

Figure 1:
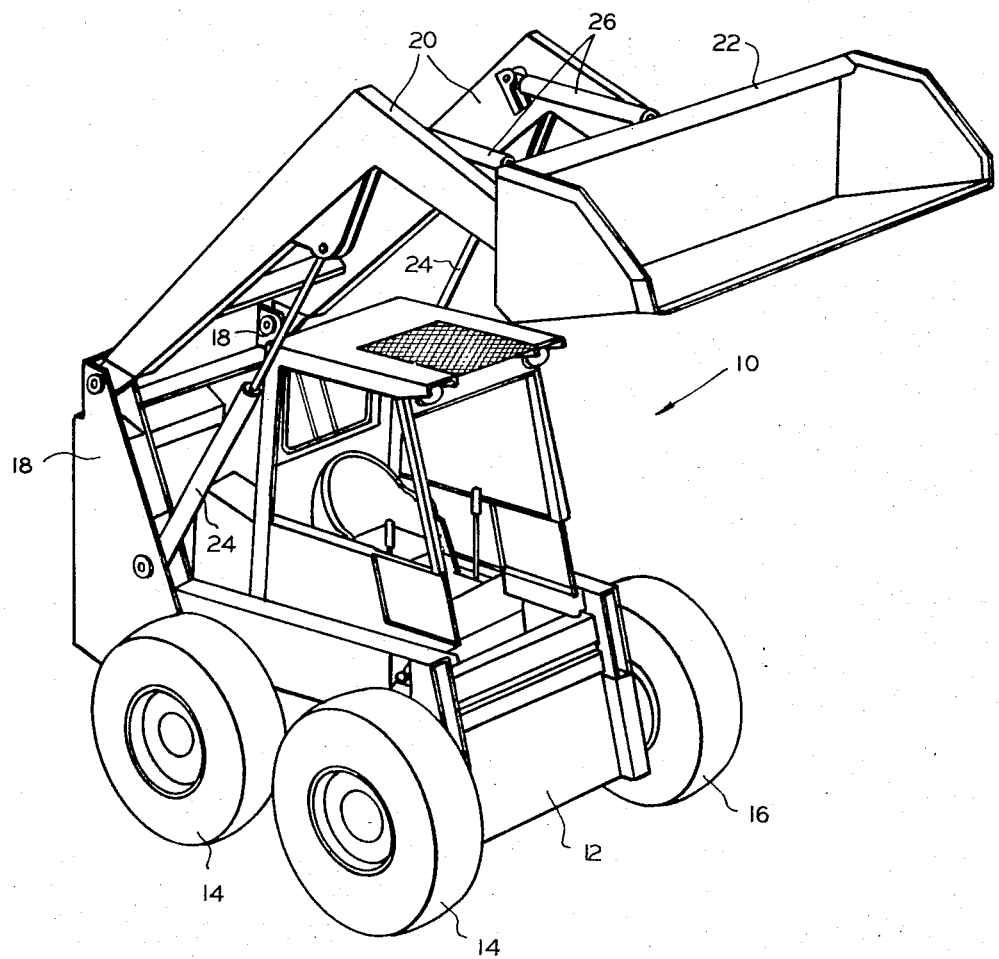
FIG. 1 is a perspective view of a compact front end loader embodying my invention.

Referring now to FIG. 1, the reference numeral 10 denotes generally a compact front end loader having a body 12 supported by a pair of drive wheels 14 on one side thereof and a pair of drive wheels 16 on the other side thereof. Connected to body 12 at the rear thereof is a pair of upwardly extending stanchions 18 to which a pair of forwardly extending boom arms 20 are pivotally connected. Connected to the forward ends of boom arms 20 for pivotal movement is a bucket 22. Boom arms 20 are raised and lowered by a pair of double-acting piston and cylinder-type fluid motors 24 connected between stanchions 18 and boom arms 20. Bucket 22 is pivoted about boom arms 20 by means of a pair of double-acting piston and cylinder-type fluid motors 26 connected between boom arms 20 and bucket 22.

Figure 2:
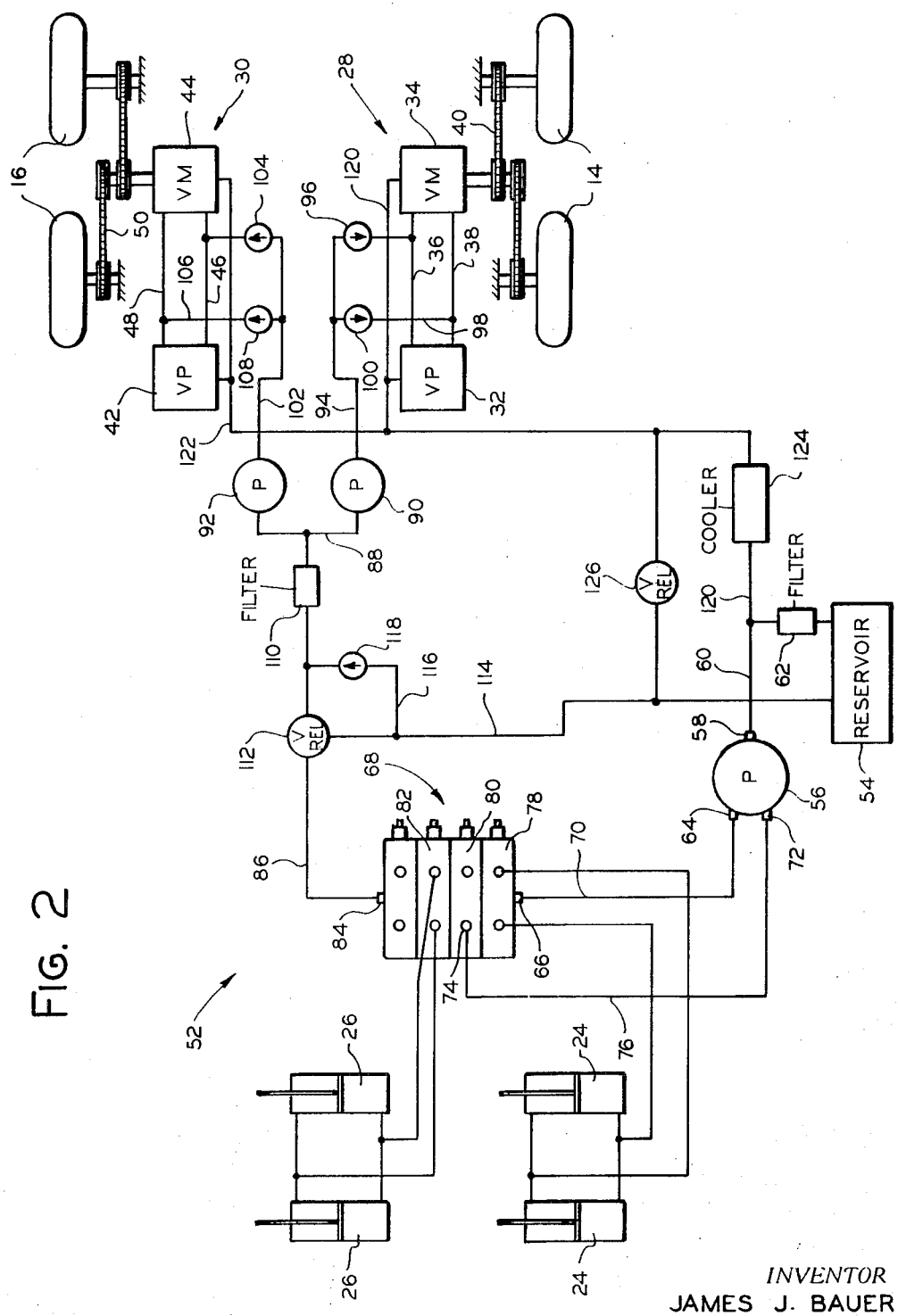
FIG. 2 is a schematic diagram of my novel fluid system.

Referring now also to FIG. 2, it will be seen that drive wheels 14 are drivingly connected to a hydrostatic drive 28 and drive wheels 16 are drivingly connected to a hydrostatic drive 30. Preferably, hydrostatic drive 28 includes an axial rotary piston pump 32 of the variable displacement type connected to an axial rotary piston motor 34 of the variable displacement type by a pair of conduits 36 and 38. Motor 34 is connected to drive wheels 14 by a chain and sprocket linkage 40. Hydrostatic drive 30 likewise includes an axial rotary piston pump 42 and motor 44 of the variable displacement type which are connected by a pair of conduits 46 and 48. Motor 44 is drivingly connected to drive wheels 16 by a chain and sprocket linkage 50.

Pumps 32 and 42 are adapted to be driven by the vehicle prime mover (not shown) which may be an internal combustion engine or some other suitable source of power. While hydrostatic drives 28 and 30 have been described with particular types of fluid pumps and motors it will be understood that there are other suitable types which could be utilized as well, and further that it may be desirable to have motors 34 and 44 of the fixed displacement type rather than the variable displacement type.

A fluid system 52 supplies fluid to accessory motors 24 and 26 and to hydrostatic drives 28 and 30 from a common reservoir 54. System 52 includes a dual pump 56 having an inlet port 58 connected to reservoir 54 by a conduit 60 which includes a filter 62. Pump 56 also has a first outlet port 64 connected to an inlet port 66 of a valve bank 68 by a conduit 70 and a second outlet port 72 connected to another inlet port 74 of valve bank 68 by a conduit 76.

Valve bank 68 includes a valve 78 which functions to control the supply of pressurized fluid from outlet 64 of pump 56 to fluid motors 24 to cause them to extend, retract or by hydraulically locked in place. Also, valve bank 68 includes a valve 80 which functions to direct only pressurized fluid supplied to inlet 74 from pump outlet 72 to another valve 82 or combines fluid flow from outlets 64 and 72 of pump 56 to supply it to valve 82. Valve 82 is similar to valve 78 and functions to control pressurized fluid received from valve 80 to motors 26 to cause them to extend, retract or be hydraulically locked in place. Valve bank 68 also includes an outlet port 84.

Connected to outlet 84 of valve bank 68 is a conduit 86 which is connected by means of a cross conduit 88 to a pair of charging pumps 90 and 92 which supply hydrostatic drives 28 and 30 with fluid.

Pump 90 is connected to conduit 36 of drive 28 by a conduit 94 which includes a one-way valve 96 and is connected to conduit 38 by a conduit 98 which is connected to conduit 94 and which includes a one-way valve 100. Thus, pump 90 will supply pressurized fluid to whichever one of conduits 36 and 38 is the low-pressure conduit, depending upon the displacement of pump 32 so that hydrostatic drive 28 is maintained filled with fluid. Similarly, pump 92 supplies pressurized fluid to conduit 46 of hydrostatic drive 30 via a conduit 102 which includes a one-way valve 104 and conduit 48 via a conduit 106 which is connected to conduit 102 and includes a one-way valve 108 so that fluid from pump 92 is supplied to whichever one of conduits 46 and 48 is the low pressure conduit, depending upon the displacement of pump 42, so that hydrostatic drive 30 is maintained filled with fluid.

Referring back now to conduit 86 it will be noted that this conduit has disposed therein a filter 110 and a valve 112 which is connected to reservoir 54 by a conduit 114. Valve 112 functions so that normally fluid from outlet 84 passes through conduit 86 to pumps 90 and 92, but in the event that the fluid output from pump 56 exceeds the demand of pumps 90 and 92, the pressure in conduits 86 will rise, thereby causing valve 112 to function, when pressure is conduit 86 reaches a predetermined point, so that fluid is bypassed directly to reservoir 54 via conduit 114.

At this point it will be clear that under normal operation of system 52 the fluid being supplied to pumps 90 and 92 already will be pressurized so that any cavitation during operation of pumps 90 and 92 is minimized. This is particularly advantageous in initial operation of the hydrostatic drives 28 and 30 under cold weather conditions when the viscosity of the fluid in the system is still high. Another advantage is that should filter 110 become clogged, all fluid supplied through conduit 86 would be returned to the reservoir via conduit 114. This will make the hydrostatic drives 28, 30 inoperable, indicating to the operator that the filter 110 requires servicing thus eliminating the possibility of unfiltered fluid entering the hydrostatic drives.

Conduit 114 also is connected to conduit 86 by a conduit 116 which bypasses valve 112 and in which a one-way valve 118 is disposed to permit fluid flow therein only from conduit 114 toward conduit 86. Thus, in the event dual pump 56 fails so that pressurized fluid is no longer being supplied to conduit 86, pumps 90 and 92 can draw fluid directly from reservoir 54 via conduit 86, conduit 116 and conduit 114. This prevents the supply of fluid to hydrostatic drives 28 and 30 being cut off due to the failure of pump 56.

Connected to pump 32 and motor 34 of hydrostatic drive 28 is a conduit 120 which receives leakage fluid therefrom and which is connected to conduit 60 and hence reservoir 54 or pump 56. Similarly, a conduit 122 is connected to pump 42 and motor 44 of hydrostatic drive 30 to receive leakage fluid therefrom and which is connected to conduit 120. Disposed in conduit 120 is a cooler 124 so that the leakage fluid from hydrostatic drives 28 and 30 is cooled and then is either recirculated through pump 56 or directed to reservoir 54, depending upon the operation of fluid system 52. An advantage of this system is that by permitting the fluid returned through conduit 120 to enter the pump 56 directly, reservoir circulation is reduced.

Disposed between conduits 120 and 114 is a relief valve 126 which serves to bypass cooler 124 in case of malfunction thereof.

In order to enable persons skilled in the art to better understand my invention, I will now explain the operation of it. It will be assumed that the prime mover associated with loader 10 is operating so that pumps 56, 90, 92, 32 and 42 are operating. Pump 56 will be supplying fluid to valve bank 68 so that upon suitable actuation of valves 78, 80 and 82 accessory motors 24 and 26 can be operated to raise or lower boom arms 20 and rotate bucket 22 about boom arms 20. Fluid from pump 56 that passes through valve bank 68 then is directed, via conduit 86 to pumps 90 and 92 which maintain hydrostatic drives 28 and 30 filled with fluid. If the fluid being supplied to pumps 90 and 92 is in excess of the requirements of these pumps, then valve 112 will operate to bypass the excess fluid through conduit 114 to reservoir 54. Should pump 56 cease to function, then pumps 90 and 92 can draw out fluid from reservoir 54 directly via conduits 114, 116, 86 and 88. Leakage fluid from hydrostatic drives 28 and 30 is returned via a conduit 120 through a cooler 124 to conduit 60 so that under ordinary operation the fluid that passes through cooler 124 is then directed to pump 56. This is advantageous because the fluid coming from cooler 124 normally is cooler than the fluid that would otherwise be drawn from reservoir 54 to supply pump 56.

While only a single embodiment of my invention has been described in detail, it will be understood that such detailed description is intended to be illustrative only and that various modifications and changes may be made to my invention without departing from the spirit and scope of it. Therefore, the limits of my invention should be determined from the attached claims.

I claim:

1. For use with a vehicle having fluid motor means and dual hydrostatic fluid drive means, a fluid system comprising valve means connected to the motor means for controlling the supply of pressurized fluid thereto, a reservoir, first pump means connected between said reservoir and valve means for drawing fluid from said reservoir and supplying pressurized fluid to said valve means, a pair of charging pumps connected in parallel to said valve means and each charging pump connected in series to one of the fluid drive means for supplying pressurized fluid to the fluid drive means, each said fluid drive means comprising variable displacement hydrostatic pump and motor circuit means being supplied with pressurized fluid from said associated charging pump, return conduit means connecting said hydrostatic pump and motor circuit means in parallel and connecting said reservoir in series for returning leakage fluid from each circuit means to said reservoir and cooling means connected between said circuit means and reservoir.

2. A system as set forth in claim 1 and including a valve connected between said valve means, said pair of charging pumps and reservoir for bypassing fluid from said valve means directly to said reservoir.

3. A system as set forth in claim 2 and including a one-way valve connected between said pair of charging pumps and said reservoir so that if said first pump means should fail to function said pair of charging pumps would draw fluid directly from said reservoir.

4. A system as set forth in claim 1 and including a one-way valve connected between said pair of charging pumps and said reservoir so that if said first pump means should fail to function said pair of charging pumps draw fluid directly from said reservoir.

5. A system as set forth in claim 3 and including fluid bypass means disposed in said return conduit means connecting said cooling means to said first pump means.

6. A system as set forth in claim 4 and including fluid bypass means disposed in said return conduit means connecting said cooling means by said first pump means.

7. A fluid system for use with a vehicle having fluid motor means and separate right and left fluid drive means, the latter means each including hydrostatic pump and motor circuit means drivingly connected to the vehicle wheels on the right and left sides respectively, said fluid system comprising first valve means connected to said fluid motor means for controlling the supply of pressurized fluid to said fluid motor means, a fluid reservoir, first pump means connected between said reservoir and first valve means for drawing fluid from said reservoir and supplying pressurized fluid to said first valve means, right and left charging pumps connected between said first valve means and said right and left fluid drive means respectively for receiving fluid from said first valve means and supplying pressurized fluid to each of said circuit means, second valve means connected to said first valve means, pair of charging pumps and reservoir so that any fluid pumped by said first pump means which is in excess of the requirements of said pair of charging pumps is bypassed to said reservoir, third valve means connected between said pair of charging pumps and said reservoir so that said pair of charging pumps can draw fluid from said reservoir when the requirements of said charging pumps exceeds the fluid output of said first pump means, return conduit means connected between said reservoir and each circuit means for returning leakage fluid from said fluid drive means to said reservoir and cooling means connected between said circuit means and reservoir, said return conduit means including a bypass conduit between said cooling means and first pump means for recirculating cooled fluid directly to said first pump means.

8. A fluid system as set forth in claim 7 wherein said pair of charging pumps are connected in parallel to said first valve means and in series to said circuit means.

9. A fluid system as set forth in claim 7 and including filter means connected between said second valve means and pair of charging pumps.

10. A system as forth in claim 1 wherein said return conduit means include a bypass means between said cooling means and said first pump means whereby at least a portion of the return fluid bypasses the reservoir and is returned directly to said first pump means.

11. A fluid system as set forth in claim 7 wherein said fluid motor means comprises first and second fluid motors and said first pump means includes first and second outlet ports, said first valve means having fluid passage means selectively connecting said first outlet port to the first fluid motor and said second outlet port to the second fluid motor and for combining fluid flow from both the first and second outlet ports to one of said fluid motors.

* * * * *